April 8, 1969　　　E. P. GOYMOUR　　　3,436,961
LOAD CELL

Filed July 18, 1966　　　　　　　　　　Sheet 1 of 5

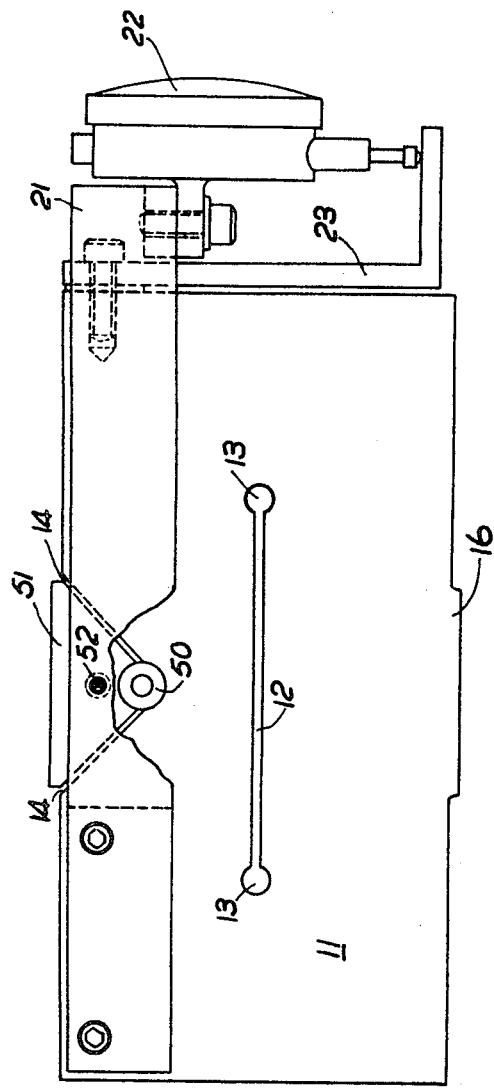
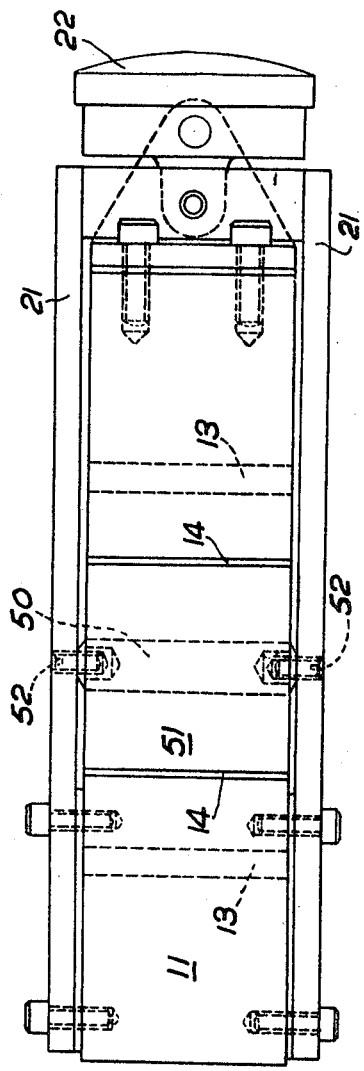
Fig. 5.
Fig. 6.

United States Patent Office 3,436,961
Patented Apr. 8, 1969

3,436,961
LOAD CELL
Edward Philip Goymour, Teddington, England, assignor to National Research Development Corporation, London, England, a body corporate
Filed July 18, 1966, Ser. No. 565,778
Claims priority, application Great Britain, July 20, 1965, 30,799/65
Int. Cl. G01l 5/12
U.S. Cl. 73—141          15 Claims

ABSTRACT OF THE DISCLOSURE

A load cell comprising a block of elastic material so shaped that under load one part of the block bends in relation to the other and the resultant bending movement is applied at a distance from the zone of bending to a measuring device.

---

Figure 1:
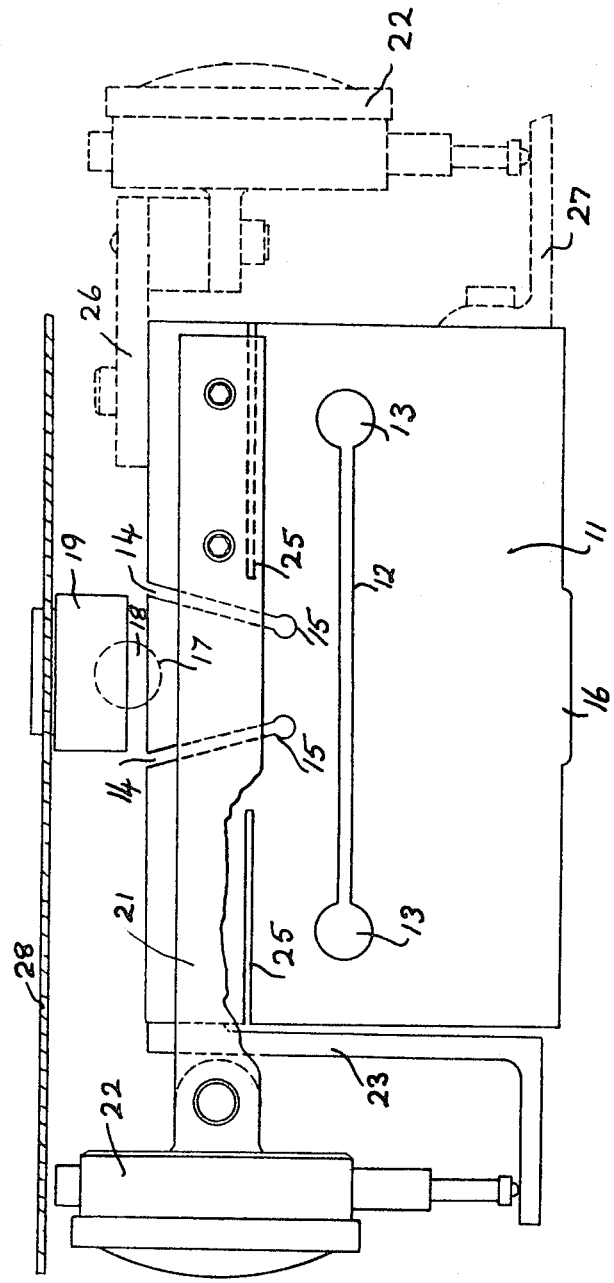

This invention relates to a load cell, that is to say, an elastic body of high stiffness having seatings, or the like, for the imposition of a load and its reaction and provided with means for measuring the deformation under load. In principle, such a device is very simple and is, in effect, a spring of very high rate, but to ensure good repeatability presents substantial practical problems. One well-known load cell is the proving ring but as the deformation is directly measured as a deflection along the force axis, for a given load capacity, this device has to be made of a large size and is correspondingly heavy while the machining of the seatings through which the load and reaction are imposed is expensive. Other known devices comprise a loop of elastic material, the deflection of which is transmitted though levers to a measuring device, and struts or columns which also transmit their deflection through levers to a measuring device. While these devices are more compact than a proving ring, they present additional problems in avoiding friction in the lever mechanism and this increases the cost of production. In these devices, again, the deflection is measured along the force axis.

According to the invention there is provided a load cell comprising a block of elastic material so shaped that under load one part of the block bends in relation to another part of the block and means for applying this relative bending movement to a measuring device spaced from the zone of bending.

Preferably the movement applying means is such that no pivoted levers are needed, and the sensitivity can be adjusted by suitable choice of the distance from the zone of bending to a measuring means, the movement at the latter being the product of the angle of bending and the distance. With a suitable construction arms can be used, bolted to the parts of the block, the bolted joints being arranged so that they do not tend to loosen under the effects of loading and unloading.

A preferred arrangement has a slot right through the block and extending over the major part of its length, parallel to its surface, and two more slots extending from one of its longitudinal faces towards the first-mentioned slot. The two last-mentioned slots are disposed so that on one side of the longitudinal slot the material is divided into three integral parts. Two of these extending from the ends of the block are, in effect, cantilevers connected at their inner ends by limited areas to the material between the two last-mentioned slots. The load and the reaction are imposed through this central portion of material and the block on the other side of the longitudinal slot, while at least one arm secured to one of the cantilevers extends to a measuring device, such as a dial indicator. There may be one arm which carries the dial indicator and another arm secured to the other cantilever which acts on its probe.

The various features and advantages of the invention will be apparent from the following description of some exemplary embodiments diagrammatically illustrated in the accompanying drawings of which:

FIGURE 1 is a diagrammatic side view of a first embodiment of the invention,
FIGURES 2, 3, 4 and 5 are similar views of alternative embodiments of the invention and
FIGURE 6 is a plan view of the embodiment of FIGURE 5.

In FIGURE 1 a block 11 of material such as EN25 steel has a longitudinal slot 12 cut along its length, the slot terminating in holes 13 to reduce stress concentration. Two more slots 14 are cut from the upper surface of the block towards slot 12, again terminating in holes 15 to reduce stress concentration. The bottom of the block is machined to leave a seating 16 and in the centre of the upper face is machined a part-spherical seating to receive a steel ball 18 carried by a holder 19. The load and reaction are imposed through the seating 16 and holder 19 and it will be seen that under load the material between the end areas on the left and on the right behave as two cantilevers which suffer bending. The actual amount of bending can be predetermined by the material of the block and its scantlings and the positions of the holes 13 and 15.

The slots 14 are shown at a slope but this is a mere matter of convenience. The closer the holes 15 are together, the greater will be the deflection but a reasonable amount of material must be left between them and a reasonable amount of material between slots 14 for the seating 17.

To measure the deflection under load two bars 21, one on either side, are secured to the right-hand cantilever, extending to the left-hand side where they are clamped to and carry a dial indicator 22. A bracket 23 is secured to the left-hand cantilever and acts upon the probe of the indicator. To avoid loosening of the bolts which secure the bar and bracket, two longitudinal slots 25 are cut in the block and the bar and bracket are secured to material which by virtue of these slots is practically unstressed when the block is under load.

Due to the length of the bars 21, the movement of the body of the indicator is substantially multiplied compared with the deflection measured along the axis of the load and this without any pivoted levers.

If these arrangements should be too sensitive in any particular case, the alternative arrangements shown in broken lines on the right-hand side of the figure can be used. Here the body of the indicator 22 is secured by the bracket 26 to the right-hand cantilever while the probe co-acts with bracket 27 secured to the under part of the block. In this arrangement not only is the leverage reduced but the deflection of only one cantilever contributes to the actuation of the indicator.

Desirably, the holder 19 serves to support a cover indicated at 28. This may be of transparent plastics material so that the indicator can be read through it.

Generally, the device shown in FIGURE 1 will have the load applied through the holder 19 and the reaction through the seating 16. In some cases it may be desirable to arrange the cantilevers on the reaction side. Then the arrangement of FIGURE 2 can be used. Those details which correspond to the details of FIGURE 1 have been given the same references and need not be described again. The deflection is transmitted to the indicator 22 by means of a bar 29 held in a socket by screws 31 and passing through a clear hole 32 in the material 33 between slots 14, its end engaging the probe of the indicator. The body of the indicator is secured to the other cantilever by a bracket 34.

Figure 2:
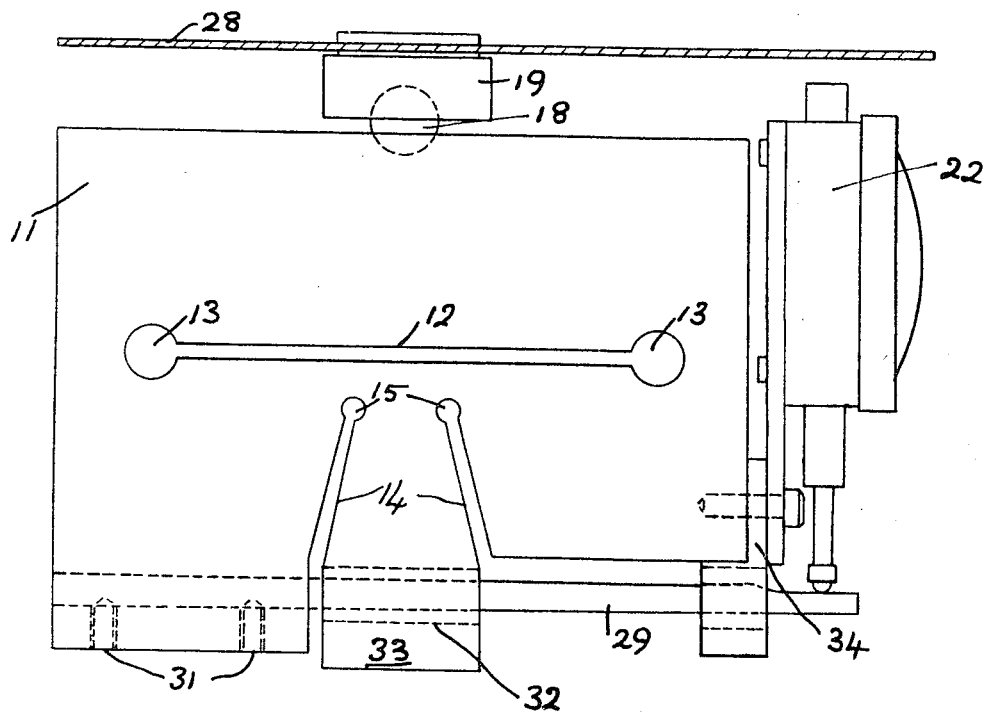

A particular advantage of the arrangements shown in FIGURES 1 and 2 is that the material on the opposite side of the slot 12 to the slots 14 produces very little, if any, of the measured deflection and therefore eliminates variations in the support on which the device stands, for example, the lower platen of a testing machine. This feature also enables this part of the block to be made as massive as desired.

Figure 3:
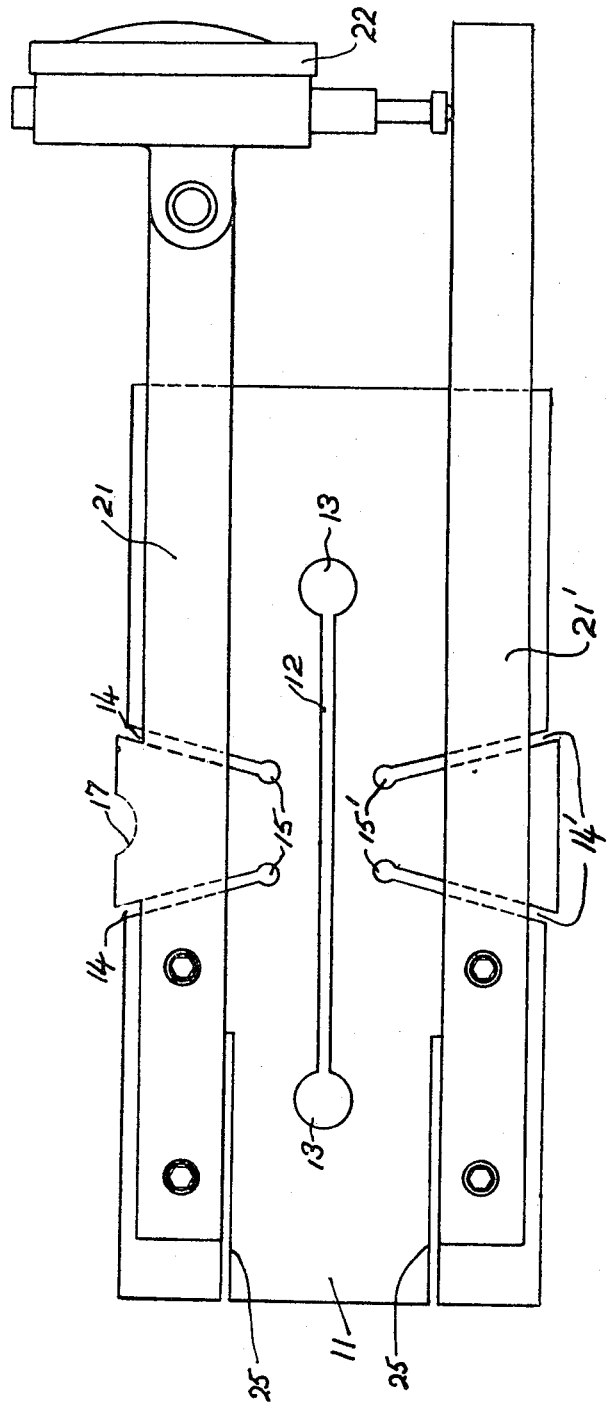

Another possible construction within the scope of the invention is shown in FIGURE 3. Here the block 11 as well as having the slot 12, slots 14, holes 15, seating 17, bars 21 and indicator 22 as in FIGURE 1, has two more slots 14′ terminating in holes 15′, extending from the lower surface on either side of the seating 16, thus producing another pair of cantilevers. Another pair of bars 21′ are secured on either side of the lower left-hand cantilever and act upon the probe of the indicator. In this case slots 25 are only needed on the left-hand side. If the lower slots 14′ and 25 were omitted this construction would become the equivalent of FIGURE 1 except that its sensitivity would be between that of the full line arrangement and that of the broken line arrangement of the indicator in that figure. If the upper slots 14 and 25 were omitted the construction would become the equivalent of FIGURE 2 but less sensitive.

All forms of the device can readily be produced by simple operations from stock material. By way of example, a device having the proportions shown in FIGURE 1 and made from a block of EN25 steel 5 inches long x 3 inches high x 1 inch thick will deflect at the centre through 0.025 for a load of 4 tons. While preserving the length and height, variations in load capacity of any of the constructions can be obtained by variation of the thickness of the block. Another advantage is that by suitable choice of the width of the slot 12 protection is automatically obtained against overloading.

Figure 4:
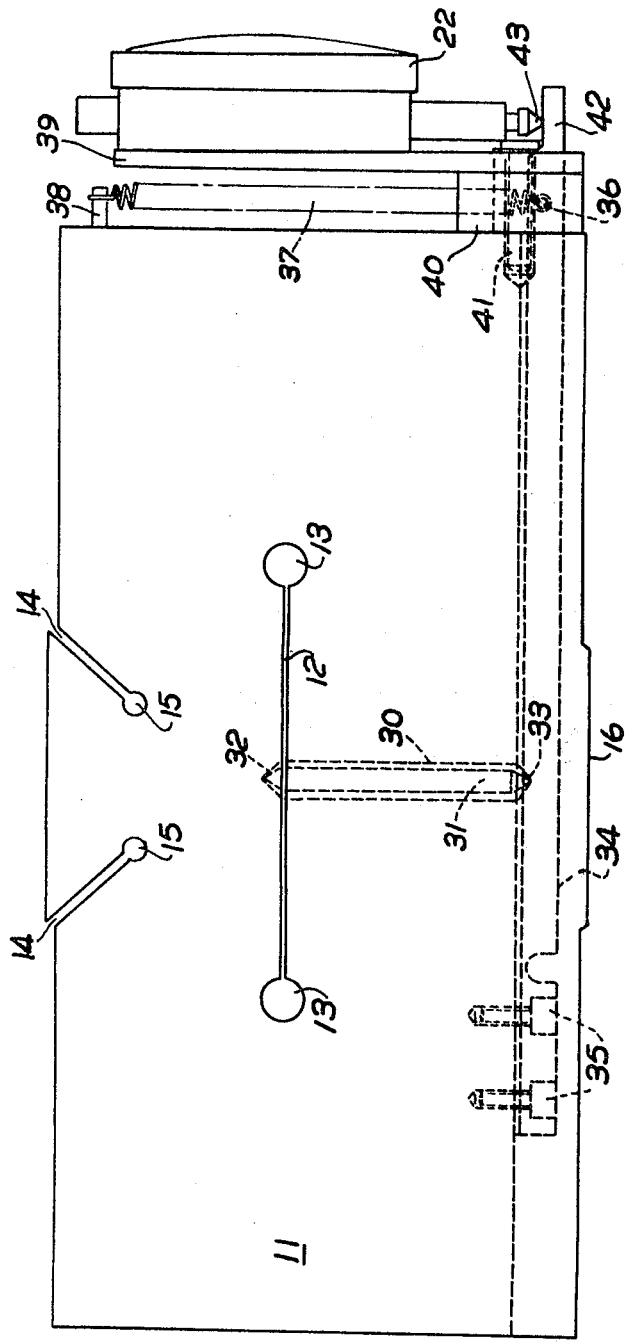

Under certain circumstances it may not be convenient to employ the ball-seat loading pad 17, 18, 19 of FIGURE 1 and under these circumstances the alternative constructions shown in FIGURE 4, and FIGURES 5 and 6 may be employed.

Referring first to FIGURE 4, the block 11 has the same longitudinal slot 12, holes 13, additional slots 14 and holes 15 as the block of FIGURE 1 but the slots 25 and seating 17 are omitted. The material of the block 11 between the slots 14 protrudes above the remaining upper face of the block, and the block is longitudinally recessed at its base a little way above the reaction seating 16. A bore 30 extends vertically upwardly through the centre of the block from the longitudinal recess at its base through the slot 12 and terminates in a conical seating 32 in that part of the block above slot 12 between the holes 15. A spring-tempered lever 34 having a conical seating 33 in its upper face is clamped by screws 35 at one end in the longitudinal recess with the seating 33 in register with the bore 30 so that a hardened spherical ended pin 31 in the bore 30 and extending between the seatings 32 and 33 acts to transmit movement of the central portion of the block 11 lying between the holes 15 to the lever 34.

Toward its right hand, free, end 43 lever 34 is anchored at 36 to one end of a coil spring 37 the other end of which is anchored to a pin 38 projecting from the body 11. The dial indicator 22 is secured to a back plate 39 by fixing screws such as 41 which pass through a spacer 40 to engage in the block 11, so that the spring 37 is accommodated in the space between the indicator and block provided by spacer 40. At its free end 42 the lever 34 engages the probe 43 of the indicator so that when the block is under compression the free end 42 of lever 34 moves downwardly to allow the indicator probe to move and provide an indication. When the load compressing the block is removed the spring 37 restores the lever 34 and indicator probe to normal positions.

A pivoted lever could be employed in place of the clamped lever 34 but the latter is preferred. This arrangement provides satisfactory results when subjected to off-centre loading but does not provide quite the same standard of repeatability as the earlier described arrangements.

Referring to FIGURES 5 and 6, although the longitudinal slot 12 and holes 13 in the block 11 are the same as in FIGURE 1, the two additional slots 14 in this particular embodiment are not provided with separate holes 15 but terminate in a common groove of part-circular section in which is positioned a hardened steel roller 50. The part of the block 11 between the slots 14 which, in the earlier described embodiments, was integral with the remainder of the block is, in the construction of FIGURE 5, a separate piece 51 of substantially triangular section having a part circular groove formed to co-operate with the upper surface of roller 50. The sections of the grooves in the body 11 and part 51 in relation to that of the roller 50 are such that the additional slots 14 are equivalent to those of the earlier described embodiments. In the arrangement of FIGURE 5, the arms 21 of FIGURE 1 are retained for transmitting the bending movement of the block under load to the indicator 22 and they also serve to accommodate retaining screws 52 for the part 51.

What I claim is:

1. A load cell comprising a block of elastic material having load and reaction seatings on respectively opposite surfaces thereof, a first slot extending longitudinally through said block in a direction parallel to at least one of said opposite surfaces and having a dimension perpendicular to its length such as to provide an interruption in the material of the block extending over at least the corresponding dimension of said seatings, and at least two further slots extending longitudinally through said block between the same faces of the block as said first slot and each extending, in a direction perpendicular to its length, from one side of one of said seatings towards the center thereof, and a measuring device connected between parts of said block which are spaced apart by at least one of said slots so as to indicate relative movement between such parts when the cell is placed under load.

2. A load cell as claimed in claim 1 wherein said two further slots extend toward but terminate short of said first slot.

3. A load cell as claimed in claim 2 wherein said block has at least one additional slot extending in a plane parallel to that of said first slot and opening into an end face of said block beyond said first slot.

4. A load cell as claimed in claim 3 having two said additional slots and wherein said measuring device is connected to parts of said block which are spaced by said additional slots from that part in which said first slot is formed.

5. A load cell as claimed in claim 3 wherein said measuring device is connected to parts of said block which are spaced apart by one of said additional slots and said first slot.

6. A load cell as claimed in claim 2 wherein said further slots are formed on opposite sides of said load seating and such seating protrudes from the face of the block in which said slots are formed.

7. A load cell as claimed in claim 6 wherein said measuring device is connected to said block by a member mounted in a recess in the reaction face of the block, said member being arranged to be acted upon by a further member received in a bore in said block which bore extends from said recess transversely through said first slot into a region of the block between said load seating and said first slot and also between said further slots such that said further member transmits to said member received in a recess movement of said region of the block relative to the end region of the block to which said measuring device is connected.

8. A load cell as claimed in claim 6 wherein said further slots converge into a part cylindrical seating which supports a hard metal roller, a triangular section part of the block between said slots having a part cylindrical seating formed therein to receive a part of the face of said roller and protruding from the face of the block on either side of said further slots.

9. A load cell as claimed in claim 8 wherein one of said measuring devices is connected to said block by members which extend along opposite sides of said block and receive retaining screws for retaining said triangular section part of the block in position.

10. A load cell as claimed in claim 1 wherein said further slots are positioned one on each side of said loading seating and said measuring device is connected to parts of the block lying respectively on opposite sides of said pair of slots.

11. A load cell as claimed in claim 1 wherein said further slots are positioned one on each side of said load seating and said measuring device is connected to parts of said block to one side of said further slots but respectively on opposite sides of said first slot.

12. A load cell as claimed in claim 1 wherein said further slots are formed one on each side of the reaction seating and said measuring device is connected to parts of the block lying respectively on opposite sides of said further slots.

13. A load cell as claimed in claim 1 wherein there are two said pairs of said further slots formed respectively on opposite sides of said load seating and said reaction seating and said measuring device is connected to parts of said block on the same side of both pairs of further slots but on opposite sides of said first slots.

14. A load cell as claimed in claim 13 wherein said block has two additional slots extending in planes parallel to and on opposite sides of that of said first slot and opening into the end face of the block beyond one end of said first slot so as to separate each part of the block to which said measuring device is secured from that part of the block in which said first slot is formed.

15. A load cell as claimed in claim 1 having a part spherical load seating in one face thereof to receive a steel ball for applying load to the cell.

References Cited
UNITED STATES PATENTS

| | | | |
|---|---|---|---|
| 2,319,299 | 5/1943 | Converse | 73—141 |
| 2,382,289 | 8/1945 | Burt | 73—141 |
| 2,695,518 | 11/1954 | Huck | 73—141 |

OTHER REFERENCES

Rinkel: Journal of Scientific Instruments, vol. 24, November 1947, pp. 298–299.

The Iron Age, Sept. 20, 1945, pp. 63 and 163.

CHARLES A. RUEHL, *Primary Examiner.*